(No Model.)
A. H. KOHLMEYER.
WATER FILTER.
No. 510,348. Patented Dec. 5, 1893.
Fig. I.
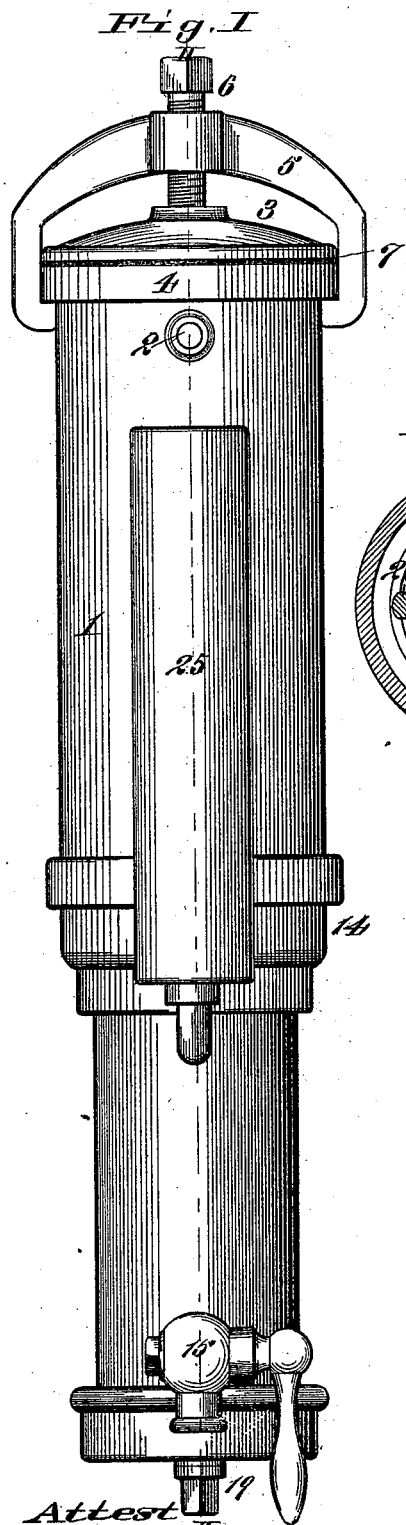
Fig. III.
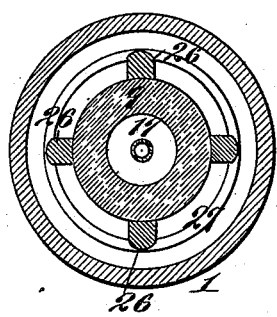
Fig. II.
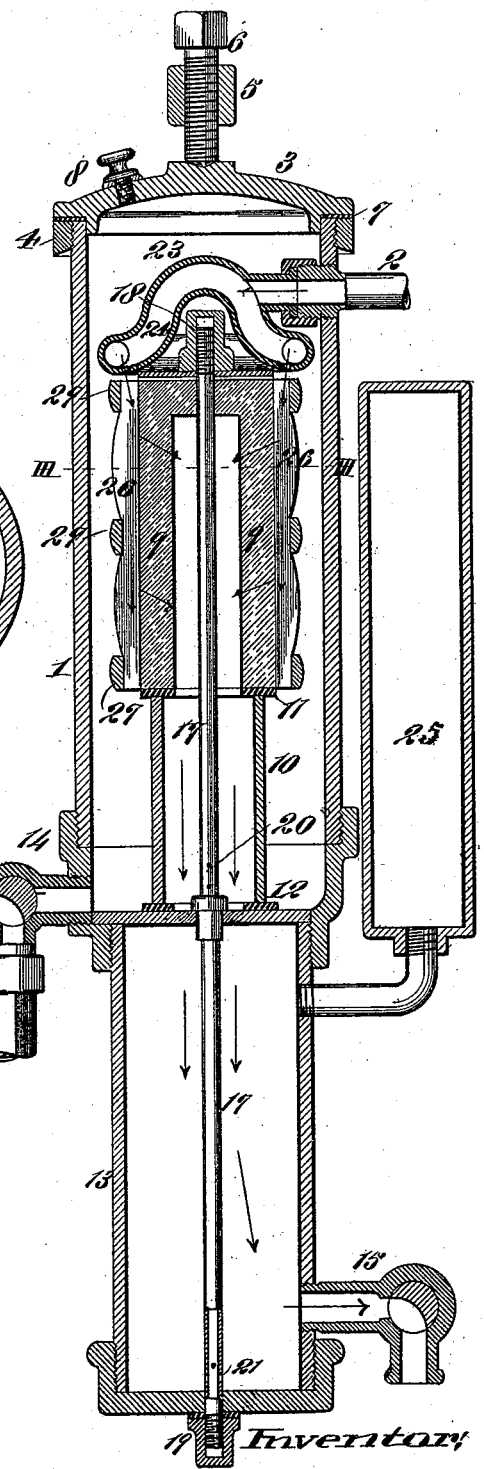
Attest
A. M. Ebersole
C. S. Knight
Inventor,
August H. Kohlmeyer,
By Knight Bro.
Attys

UNITED STATES PATENT OFFICE.

AUGUST H. KOHLMEYER, OF ST. LOUIS, MISSOURI.

WATER-FILTER.

SPECIFICATION forming part of Letters Patent No. 510,348, dated December 5, 1893.

Application filed July 3, 1893. Serial No. 479,470. (No model.)

*To all whom it may concern:*

Be it known that I, AUGUST H. KOHLMEYER, of the city of St. Louis, in the State of Missouri, have invented a certain new and useful Improvement in Water-Filters, of which the following is a full, clear, and exact description, reference being had to the accompanying drawings, forming part of this specification.

My invention relates to certain improvements in water filters, the object being to simplify the construction, while at the same time maintaining or providing for the self-cleansing of the filtering block, and further providing for a pressure to lift the water from the filter to a higher elevation.

My invention consists in features of novelty hereinafter fully described and pointed in the claims.

Figure I is a side elevation, illustrative of my improved filter. Fig. II is a longitudinal, vertical section, taken on line II—II, Fig. I. Fig. III is a transverse section, taken on line III—III, Fig. II.

Referring to the drawings, 1 represents a cylinder, with which the water supply pipe 2 connects; the pipe 2 may lead from a water main, or other source from which water may be obtained. The cap 3 of the cylinder is preferably held in place through means of a ring 4, threaded onto the upper end of the cylinder, and which receives the lower hooked ends of a bail 5, through which a set screw 6 is passed, the lower end of which jams against the cap 3 and holds it tightly upon the upper end of the cylinder, as shown. A gasket 7 may be placed between the cap 3 and the upper end of the cylinder.

8 represents a vent, to permit the escape of air when the cylinder is being first filled with water.

9 represents a filtering block composed preferably of natural stone, such as tripoli and which is supported within the cylinder 1 upon the upper end of a sleeve 10, with a gasket 11 between them, if desired. The sleeve 10 rests upon the bottom of the cylinder, or upon a gasket 12 interposed between it and the bottom of the cylinder.

13 represents a clear water tank located beneath the cylinder 1, and connected thereto by any suitable means. I have shown them connected by means of a union 14.

15 represents the faucet through which the clear water is drawn from the tank 13.

16 represents a valve and pipe through which the water from the cylinder 1, together with any mud which may settle in the bottom of the cylinder may be drained or removed. This pipe communicates with the bottom of the cylinder, as shown in Fig. II, so as to provide for the removal of all sediment from the cylinder.

17 represents a pipe passing through the filtering block 9, through the sleeve 10, and through the tank 13. There is a head or nut 18 on the pipe above the filtering block, and a head or nut 19 on the pipe beneath the tank. It will be seen that this pipe 17 serves to hold the filtering block and sleeve 10 in place, and it is also utilized to conduct the water from the filtering block into the tank 13. As the water percolates through the filtering block and passes into the sleeve 10, it enters the tube 17, through perforations 20, and passing to the lower end of the tube escapes into the tank 13, through perforations 21. By using the sleeve 10, the filtering block is located some distance above the bottom of the cylinder 1, affording ample opportunity for the sediment to settle in the cylinder beneath the filtering block. The inner end of the pipe 2 is preferably provided with a hollow head 23, having a series of perforations 24, as shown in Fig. II. The object of providing this head 23 is to cause the water to be delivered to the cylinder in such a manner as to tend to create a current along the surface of the filtering block, of sufficient force to keep the surface of the block clear from sediment settling thereon. The course and direction of the water from the head are illustrated by arrows in Fig. II.

It is highly desirable to keep the filtering block or material clear of sediment, as far as possible, so as not to interfere with the sufficiently rapid filtering of the water, and also to effect the thorough filtering of the water. It is also highly desirable to be able to conduct water from the filter to a higher elevation, as, for instance, from the first to the second or third story of a building. My filter is well adapted to effect both of these results, and to effect both of these results in a thorough manner, I connect an air chamber 25 with the water tank 13. As the water filters into the tank 13, it forces the air therefrom into the chamber 25, where it is compressed to an amount equaling the pressure in the pipe 2. Now each time the pressure in the pipe 2 is reduced (either by the varying pressure of the water in the main, or by water being taken from the pipe 2 at a point back of the filter), the air pressure in the chamber 25 will cause an upward circulation of water from the tank 13 through the perforated tube 17, and outwardly through the filtering block, and this outward passage of the water through the filtering block causes the block to be cleaned and freed from sediment, which may have settled thereon, or which may have become lodged in the interstices of the block; and thus the block is kept clean by the automatic operation of the filter. When water is to be drawn from the filter at a higher elevation than the filter, the compressed air in the chamber 25 serves to force the water from the tank 13 through the opened faucet above.

By using a perforated pipe for conducting the water from the filtering block, and for conducting the water back to the filtering block from the air chamber, when the pressure on the supply pipe of the filtering block is reduced, the danger of breaking the filtering block by the reflux of water is largely avoided, from the fact that it cannot pass rapidly back through the pipe, owing to the fact that it has to pass through the perforations in the pipe, which retard its force.

To avoid any possibility of the backward pressure through the filter, when the pressure in the pipe 2 is reduced, breaking the block 9, I have arranged vertical strips 26 around the block, and which are held in place against the block by means of horizontal rings 27. (See Figs. II and III.) The rings 27 fit outside of the strips 26, and thus do not interfere with the water escaping from the head 23 serving to keep the surface of the block clean.

I claim as my invention—

1. In a water filter, the combination of a cylinder having a supply pipe, a filtering block located within the cylinder, a water tank, a perforated pipe for conducting the water from the filtering block to the tank, and an air chamber the perforations in said pipe being relatively much smaller than the internal diameter of the pipe, so as to retard the backward flow of the water, to avoid danger of breaking the filtering block; substantially as and for the purpose set forth.

2. In a water filter, the combination of a cylinder having a supply pipe, a filtering block located within the cylinder, a sleeve located between the filtering block and the bottom of the cylinder, a tank located beneath the cylinder, and a communication between the filtering block and said tank; substantially as and for the purpose set forth.

3. In a water filter, the combination of a cylinder, a filtering block located within the cylinder, a sleeve located between the filtering block and bottom of the cylinder, a water tank located beneath the cylinder, and a perforated pipe serving to hold the filtering block and sleeve in place and serving also to form a communication between the filtering block and said tank; substantially as and for the purpose set forth.

4. In a water filter, the combination of a cylinder, a filtering block located within the cylinder, a sleeve located between the filtering block, and the bottom of the cylinder, a tank located beneath the cylinder, a perforated pipe serving to hold the filtering block and sleeve in place, and serving to conduct the water from the filtering block to the said tank, and an air chamber 25; substantially as and for the purpose set forth.

5. In a water filter, the combination of a cylinder, a filtering block located within the cylinder, a water tank located beneath the cylinder, a communication between the filtering block and said tank, an air chamber, and means for preventing said filtering block from breakage under the pressure of the air contained in said chamber; said means consisting of longitudinal strips 26 and rings 27; substantially as and for the purpose set forth.

AUGUST H. KOHLMEYER.

In presence of—
A. M. EBERSOLE,
E. S. KNIGHT.